Patented Mar. 26, 1940

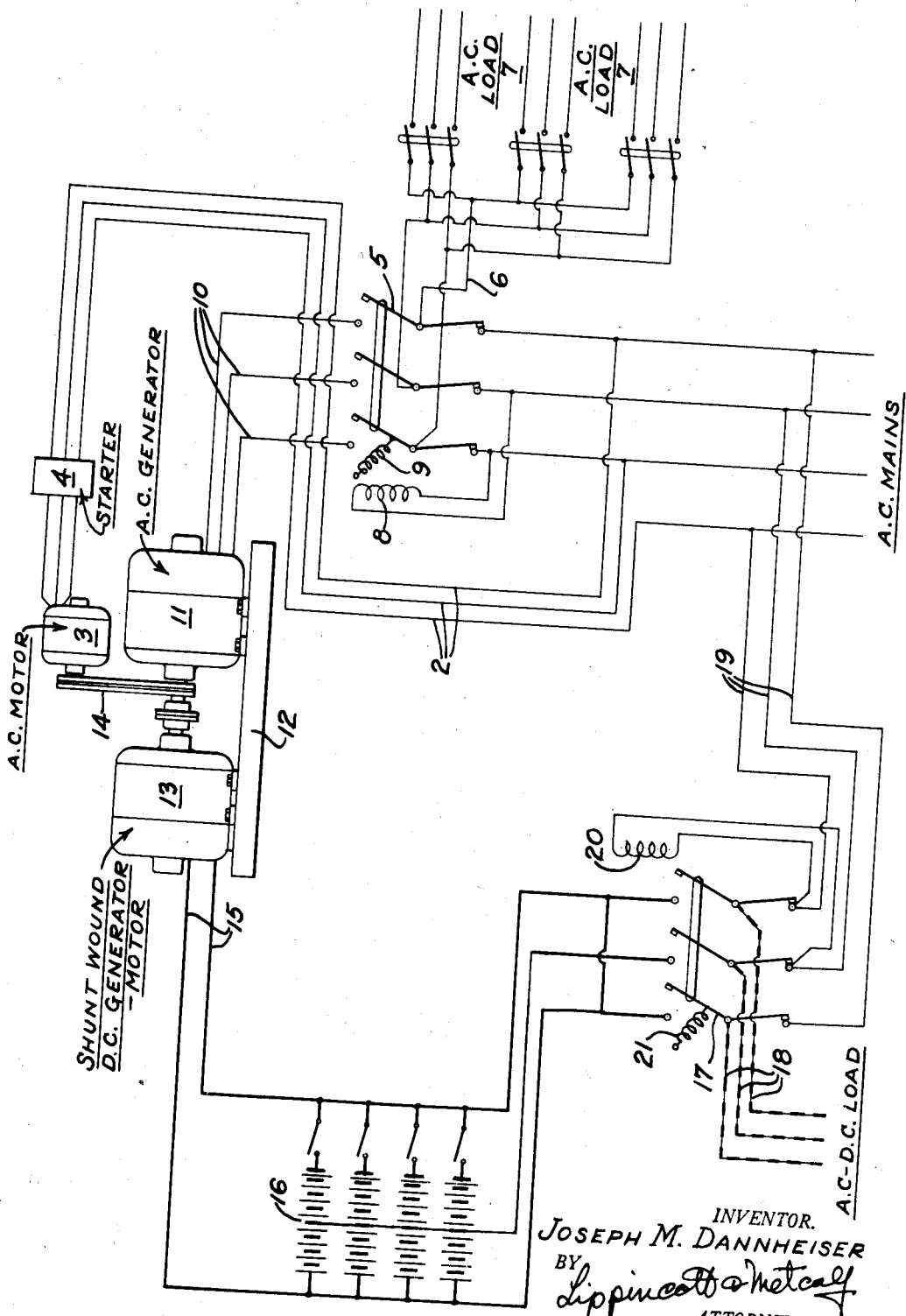

2,194,822

UNITED STATES PATENT OFFICE 2,194,822

EMERGENCY POWER SYSTEM

Joseph M. Dannheiser, San Francisco, Calif., assignor to Es-B-Es-Co., "Ltd.," San Francisco, Calif., a corporation of California Application April 24, 1939, Serial No. 269,590

2 Claims. (Cl. 171—97)

My invention relates to emergency power systems, and more particularly to a system for supplying stand-by or emergency power in case of failure of alternating current mains.

Among the objects of my invention are: To provide an emergency power system operating substantially without delay in case of power failure; to provide an A. C. emergency source in case of main line failure; and to provide a simple, quick operating emergency A. C. power system for radio stations or similar power consuming apparatus requiring an A. C. source.

Other objects of my invention will be apparent or will be specifically pointed out in the description forming a part of this specification, but I do not limit myself to the embodiment of the invention herein described, as various forms may be adopted within the scope of the claims.

Usually, emergency stand-by equipment for supplying power in case of main power line failure has been of the D. C. type, because in most cases emergency lighting is the most important demand and direct current can be substituted for alternating current in incandescent lamps in a very satisfactory manner. However, there are installations of various characters operating from A. C. mains which cannot be supplied with D. C. power in case of main line A. C. failure. One of such installations, for example, is a radio transmitting station where alternating current is required, due to the fact that high voltages are necessary in the operation of the device, thereby requiring transformers and excluding the use of direct current.

Furthermore, equipment such as a radio transmitting station requires an uninterrupted power supply if service is to be continuous. For example, high powered radio transmitting tubes do not hold their frequency constant unless heat dissipation is constant. Furthermore, electrically heated cathodes in radio transmitting sets are heavy and of large mass, and once a power failure has occurred, a length of time much longer than the actual power failure is required before the system can be placed in operating condition. Thus, even a short A. C. power failure in a radio transmitting station will cause a much longer outage than the actual time the power is off. For that reason A. C. generators standing by with internal combustion engines as driving power are not satisfactory because of the time involved in starting the engines and bringing them up to speed.

My invention provides for such immediate substitution of A. C. power sources that an attached A. C. load is not affected, and in the case of a radio transmitting station the substitution of A. C. sources takes place so quickly that the power tubes do not have time to lose a sufficient amount of heat to cause any outage whatsoever.

My invention can be more readily understood by reference to the drawing having a single figure, being a simplified circuit showing one manner in which my invention may be practiced. All portions of the A. C. circuit are in light lines, and all portions of the D. C. circuit are in heavy lines. For the sake of clarity, all control and monitoring circuits have been omitted, as well as overload releases and similar protective devices.

A. C. mains 1, which may be of the three-phase type if desired, energize directly, through a motor line 2, an A. C. motor 3 handled by the usual starting box 4. A. C. mains also lead to a three-pole automatic transfer switch 5, the three blades leading through circuit 6 to A. C. load circuits 7. Transfer switch 5 is held in contact with the A. C. mains 1 by holding coil 8, and spring 9 throws the transfer switch onto A. C. generator line 10 when current failure occurs in the A. C. mains and current is withdrawn from holding coil 8.

A. C. generator line 10 handles the output of A. C. generator 11 which is mounted on a base 12 and direct-coupled to a shunt-wound D. C. generator-motor 13, preferably mounted on the same base. A. C. motor 3 is connected to rotate the coupled A. C. generator and D. C. generator-motor through a belt 14, or by any other convenient means such as being directly connected. Output-input circuit 15 of the D. C. generator-motor leads to a storage battery bank 16 of several series units connected in series multiple, which also supplies a lighting load automatic transfer switch 17, similar in all respects to the A. C. load transfer switch previously described. The blades of this switch lead through circuit 18 to the lighting load. A. C. lighting load circuit 19 connects the A. C. mains 1 to the lighting load through one side of switch 17, and the switch blades are held there by lighting load holding coil 20. Transfer switch 17 is thrown to the D. C. side by lighting load transfer spring 21 upon A. C. power failure.

The operation of my emergency power system is simple. Transfer switches 5 and 17 are normally placed and held by holding coils 8 and 21 on the A. C. side, thus supplying lights and A. C. loads such as, for example, those of a radio transmitting station. At the same time A. C. motor 3 is started, rotating both A. C. generator 11 and D. C. generator-motor 13. Inasmuch as no load is taken under these circumstances from the A. C. generator, its rotor runs freely. D. C. generator-motor 13, however, is rotated by motor 3 at such a speed as to provide a charging overvoltage for battery 16. For example, A. C. motor 3 may rotate D. C. generator-motor 13 as a generator at a speed of 2200 R. P. M. Thus, the batteries 16 are continually being charged during the time that A. C. power is present in the mains 1. Upon failure of the A. C. mains or upon dropping of voltage therein below the point where holding coils 8 and 21 no longer can hold transfer switches 5 and 17 in the A. C. position, these transfer switches will be released and springs 9 and 21 will immediately connect the A. C. load through switch 5 to the output of A. C. generator 11, and the lighting load direct to the storage battery 16. A. C. motor 3 will immediately become de-energized, and the shunt wound D. C. generator-motor will slow down until its output voltage becomes less than that of the storage battery 16, whereupon D. C. generator-motor 13 will immediately start to run as a motor in the same direction, driving A. C. generator 11 at a speed, for example, of 1800 R. P. M. A. C. generator 11, however, is a generator designed to give full A. C. voltage equal to line voltage and the proper frequency at 1800 R. P. M., and the D. C. generator-motor will continue to act as a motor applying emergency A. C. power by driving A. C. generator 11 to the A. C. load 7, until power is restored in mains 1 and the loads shifted back to the A. C. mains.

When power is back in mains 1, transfer switches 5 and 17 may again be thrown back onto the A. C. side and the loads picked up by the mains, whereupon A. C. motor 3 is energized, D. C. generator-motor 13 is speeded up again to 2200 R. P. M., and again acts as a generator charging battery 16.

I have found that the extremely short time of outage, namely, only sufficient for transfer switches 5 and 17 to act, is too short a time for the devices operated by the A. C. load to be affected, and in the case of the radio transmitting tubes the almost instantaneous transfer from A. C. mains to A. C. generator is too small to cause a sufficient heat loss of any outage whatsoever, and in fact the transfer occurs so quickly that it is impossible for the operator of the radio station, for example, to notice any more than a slight flicker when the transfer is made. The load being placed on A. C. generator 11 at the same time A. C. motor 3 is de-energized causes an almost instantaneous deceleration of D. C. generator-motor 13 to its motor speed, and the storage batteries pick up the load without lapse of any appreciable time.

It will be distinctly understood that the circuits I have shown are simplified and do not show such protective devices such as for example switches that may be necessary to open the D. C. line under no-load conditions. However, such protective monitoring and control devices are well known to those skilled in the art and form no part of the present invention, the essence of the present invention being the automatic conversion of a shunt wound D. C. generator operating at one speed to a D. C. motor operating at a lower speed in the same direction, driving an A. C. generator for emergency power use in case of A. C. power line failure.

I claim:

1. In a system for supplying emergency power to an A. C. load upon failure of an A. C. power line normally supplying power for said load comprising an A. C. motor driven from said line, a D. C. generator and a normally electrically open A. C. generator coupled together and driven by said A. C. motor at a higher speed than that giving proper A. C. line frequency, storage batteries normally and directly charged by said D. C. generator, and automatic means for shifting said A. C. load from said main A. C. line to the output of said A. C. generator when the main A. C. line voltage drops below a predetermined value, whereby said D. C. generator rotates in the same direction, as a D. C. motor directly energized from said batteries to drive said A. C. generator at a speed giving the same A. C. frequency to the load as the A. C. mains.

2. In a system for supplying emergency power to an A. C. load upon failure of power mains normally supplying power for said load comprising a D. C. generator, storage batteries directly connected to the output of said D. C. generator, an A. C. generator coupled to said D. C. generator, means for driving said D. C. and A. C. generators from said main line at a speed providing a D. C. charging current, and means for automatically connecting said A. C. generator to said main line in case of power failure therein and to connect said A. C. generator to said A. C. load, said D. C. generator picking up the load by continuing rotation as a motor at a reduced speed as determined by the voltage of said batteries, said A. C. generator being wound to give main line frequency at said reduced speed.

JOSEPH M. DANNHEISER.